Jan. 28, 1958 J. A. MARCEL 2,821,692

UTILITY POWER CORD FOR TELEVISION RECEIVERS

Filed April 15, 1955 2 Sheets-Sheet 1

INVENTOR.
JESSE A. MARCEL
BY
McMorrow, Berman + Davidson
ATTORNEYS

Jan. 28, 1958 J. A. MARCEL 2,821,692

UTILITY POWER CORD FOR TELEVISION RECEIVERS

Filed April 15, 1955 2 Sheets-Sheet 2

INVENTOR.
JESSE A. MARCEL

BY

McMorrow, Berman + Davidson
ATTORNEYS

Patented Jan. 28, 1958

2,821,692

UTILITY POWER CORD FOR TELEVISION RECEIVERS

Jesse A. Marcel, Houma, La.

Application April 15, 1955, Serial No. 501,565

1 Claim. (Cl. 339—163)

This invention relates to electrical current outlets, and more particularly has reference to an outlet attachable to the power socket of a conventional television receiver.

Conventionally, a television receiver for domestic use has a safety back cover provided with a power socket, said socket being recessed and having within the recess male elements adapted to be received in female elements of a television power supply plug carried by a convenience cord, said cord at its other end having a conventional electrical plug for insertion in the convenience outlet of the domestic power supply.

If it is desired to use other electrical appliances adjacent or in conjunction with the television receiver, it is necessary that the convenience cord of each appliance be engaged, independent of the power supply cord of the receiver, with a convenience outlet of the home. Often, a number of appliances or accessories are used with or adjacent a television receiver, such as lamps, boosters, antenna rotor controls, UHF converters, record players, electric clocks, and the like.

In view of the inconvenience resulting from the above described, conventional arrangement, the main object of the present invention is to provide a television receiver power supply connector, so designed as to have a single cord capable of being plugged into the domestic convenience outlet, with said cord carrying connector means one portion of which is capable of being plugged into the power supply socket of the television receiver, and another portion of which is adapted to provide a multiplicity of receptacles into which can be extended the electrical plugs of a corresponding number of television receiver accessories or electrical appliances.

A more specific object is to provide a unit as described mountable on the back safety cover of a television receiver, in such a manner as to retain the safety feature of the receiver and eliminate the conventional television power supply cord.

Another object is to provide an outlet as described employing slotted receptacle contacts, thus permitting a greater number of A. C. plugs to be used in a limited space.

Still another object is to provide a device as stated which will provide power access for television service personnel with maximum ease and facility, for operating test instruments when the television receiver is serviced in the home.

A further object of importance is to provide a device as stated which will be capable of manufacture at relatively low cost, by reason of its adapability for mass production using conventional manufacturing methods.

Other objects will appear from the following description, the claim appended thereto, and from the annexed drawing, in which like reference characters designate like parts throughout the several views, and wherein:

The device constituting the present invention includes an elongated, rectangular, flat cover 10 adapted to overlie a base 12 having an outer configuration corresponding to that of the cover. The cover 10 and base 12 are of electrically insulative material, such as molded plastic, and are detachably connectable in face to face contact by screws 14 extending therethrough at opposite ends of the attachment.

Figures 1, 2, 3:
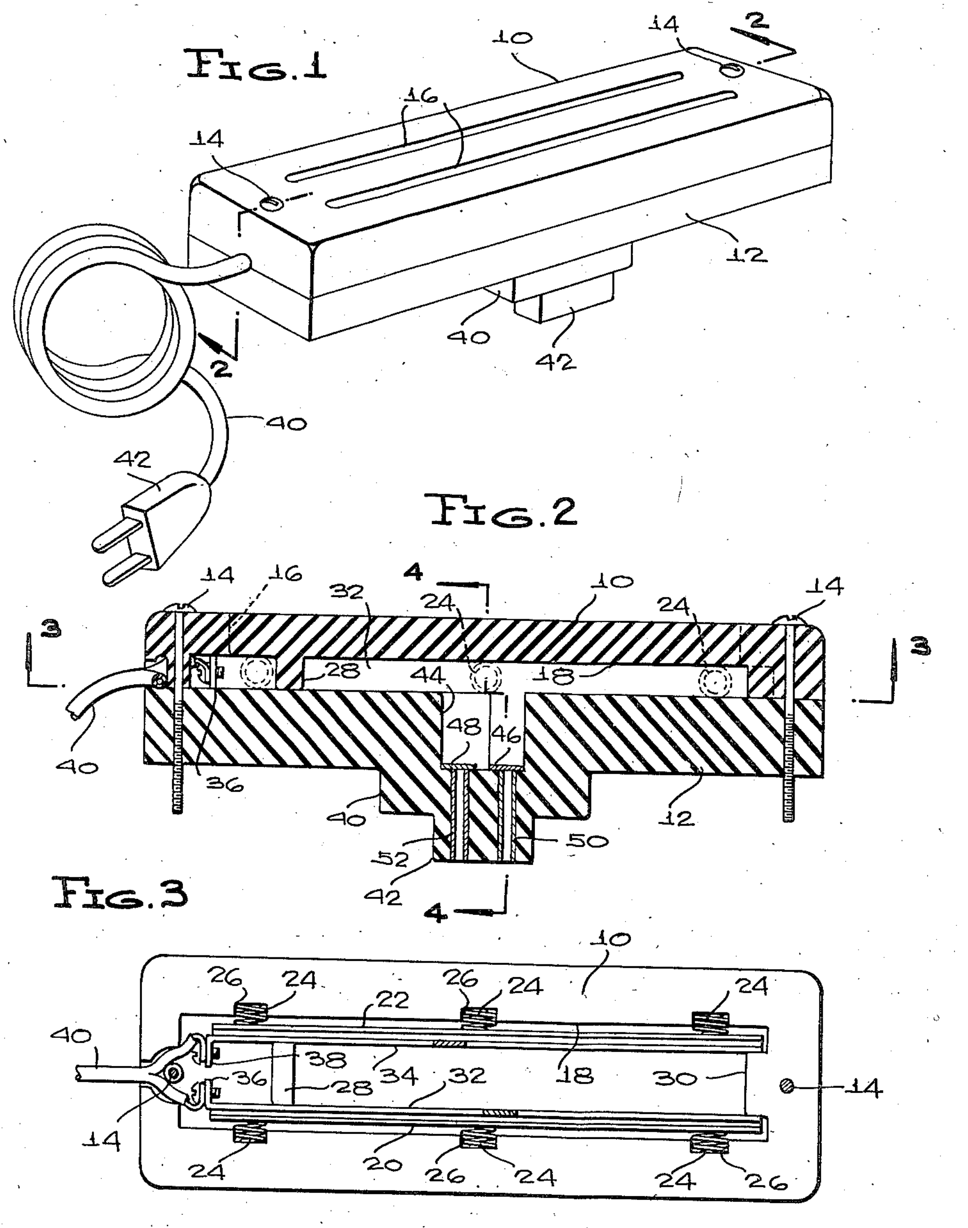
Figure 1 is a perspective view of a television receiver outlet attachment formed according to the present invention.
Figure 2 is a longitudinal section on line 2—2 of Figure 1.
Figure 3 is a sectional view on line 3—3 of Figure 2.

Formed in the cover 10 are laterally spaced, elongated, longitudinal slots 16, communicating with a bottom recess 18 which, as shown in Figure 3, is of elongated, rectangular shape, and extends longitudinally and centrally of the cover.

Extending within the recess adjacent the opposite sides thereof are floating bus bars 20, 22, transversely bowed in a direction toward one another. Small compression springs 24 are spaced longitudinally of the respective bus bars, and are engaged in spring sockets 24 correspondingly spaced along the length of the recess 18. The springs 24 resiliently, yieldably urge the floating bus bars toward one another, in a direction transversely of the recess.

Figures 4, 5, 6:
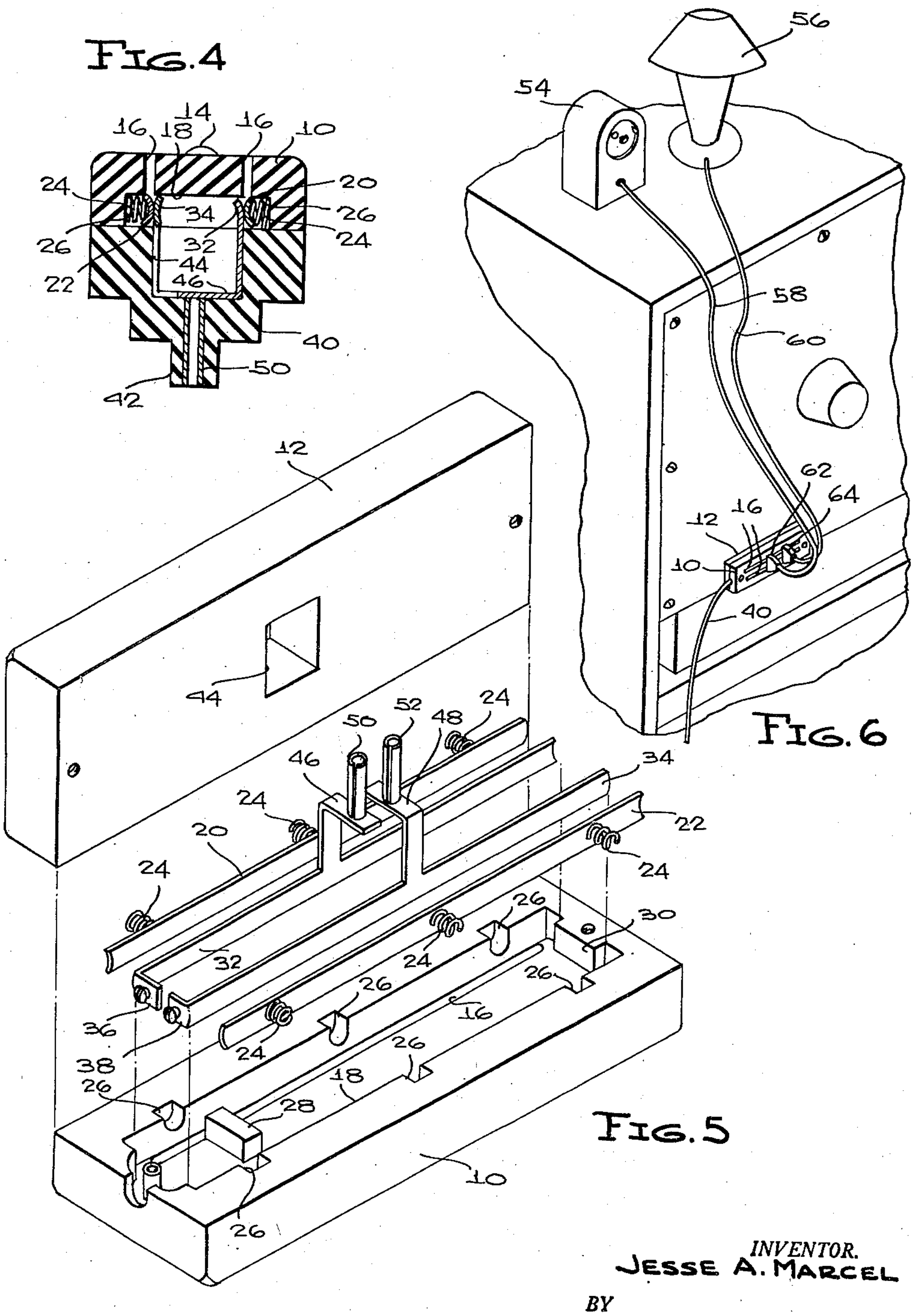
Figure 4 is a transverse section on line 4—4 of Figure 2.
Figure 5 is an inverted, exploded perspective view of the attachment.
Figure 6 is a fragmentary perspective view showing the rear of a television receiver equipped with an attachment formed according to the present invention.

Abutments 28, 30 are molded on the cover, within the recess 18 (Figures 3 and 5). The abutment 28 extends transversely of the recess, in spaced relation to the respective side walls of the recess adjacent one end of the recess. The abutment 30 is molded upon one end wall of the recess, and extends transversely of the recess a distance corresponding to that of the abutment 28.

Engaged against the abutments 28, 30 are stationary bus bars 32, 34 coextensive with the floating bus bars, and transversely bowed in a direction oppositely to the bus bar as shown in Figure 5. Springs 24, tending to expand, force the floating bus bars into contact with the stationary bus bars, when no accessory or appliance plugs are engaged with the attachment. However, when the prongs of plugs of this type are extended through the slots 16, they enter between the floating and stationary bus bars, forcing the same apart against the restraint of the springs.

At one end, the stationary bus bars are integrally formed with lateral extensions 36, 38 projecting toward one another as shown in Figure 5, and said extensions are provided with threaded apertures receiving connecting screws, that attach to the extensions the respective leads of a power supply cord 40 having, at the end thereof remote from the casing defined by the base 12 and cover 10, a conventional electrical plug 42 having prongs insertable into a conventional convenience outlet, not shown, of a home.

On the base 12, there is formed a central, rectangular boss 40, having a reduced outwardly projecting portion 42. Centered in the base 12 in respect to the boss 40 and portion 42 is a rectangular recess 44 communicating with recess 18, and integrally formed upon the stationary bus bars 32, 34 are depending tongues 46, 48 of L-shape, extending into the recess 44. Fixedly secured to the tongues are electrically conductive sleeves 50, 52 molded into the boss 40 and reduced portion 42 and opening at their outer ends upon the outer surface of the portion 42.

In use of the device, the portion 42 is plugged into the conventional television power socket provided on the back cover of the television receiver, and plug 42 is engaged in an associated convenience outlet. As a result, the television receiver will be connected with the domestic power supply, since current will flow through 46, 48, and sleeves 50, 52, and the prongs provided in the power socket of the television receiver.

A pair of typical appliances is shown at 54, 56 in Figure 6, these being an electric clock and lamp. Different appliances or television receiver accessories can be used, as hereinbefore described, and the number of said accessories is limited only by the load that can be carried by the cord 40, and by the number of appliance plugs that can be engaged with the attachment along the length of the slots 16.

The illustrated appliances have convenience cords 58, 60, respectively provided with conventional electrical plugs 62, 64, and at any location along the length of the slot 16, the prongs of the plugs 62, 64 can be extended into the slots, to force the stationary and floating bus bars apart. As a result, the appliances, as well as the television receiver, are connected to the domestic power supply, and are selectively usable independently of one another and independently of the receiver.

It will be seen that the device has considerable advantages over conventional arrangements wherein electrical power is to be supplied to a television receiver and one or more accessories or appliances physically located adjacent the same. Instead of the requirement of providing a separate receptacle in the home for each of the plugs of the appliances, as well as for the television power cord, the single cord 40 is plugged into the convenience outlet, after which a multiplicity of outlets results for the several associated appliances.

At the same time, whenever the set is to be serviced, the removal of the back cover of the receiver disconnects the power from the television chassis, thus retaining the safety feature intended by the television manufacturer. Further, considering the compactness of the device, a substantial number of plugs can be engaged therewith, said number being limited only by the width of the plugs in relation to the lengths of slots 16.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

An electrical outlet comprising: an elongated housing including a base having a central recess, and a cover formed with an elongated longitudinal recess and with a pair of elongated transversely spaced slots of a length closely approximating the length of the second recess, said slots communicating with the second named recess, said cover including a pair of abutments spaced longitudinally of and extending transversely of the second named recess; means fixedly connecting the base and cover to each other; a pair of elongated stationary bus bars coextensive with the slots and extending within the second named recess in engagement with and at opposite sides of said abutments; a convenience cord having leads connected to the respective stationary bars; angular tongues rigid with said stationary bars and engaged in the first-named recess; plug elements rigid with said tongues and embedded in the base to cooperate with the abutments in holding said bus bars against movement within the housing; elongated, movable bus bars extending in the second named recess adjacent the respective stationary bars, said movable bars being coextensive with the slots and stationary bars; and springs mounted in the cover and bearing against the respective movable bars, said springs being tensioned to bias the movable bars into longitudinal contact with the stationary bars, the slots extending in substantial alignment with the longitudinally contacting stationary and movable bars, for extension of the prongs of an electrical plug through the slots between the contacting bars at any of a plurality of locations along the length of the slots and bars, the length of each slot being such that corresponding prongs of a plurality of plugs are simultaneously engaged in a single one of the slots.

References Cited in the file of this patent

UNITED STATES PATENTS

| | | |
|---|---|---|
| 1,610,205 | Fritts | Dec. 7, 1926 |
| 1,731,661 | Hauenstein | Oct. 15, 1929 |
| 1,889,695 | Petersen | Nov. 29, 1932 |
| 2,619,516 | Schneider | Nov. 25, 1952 |
| 2,714,712 | Riccardelli | Aug. 2, 1955 |

OTHER REFERENCES

Radio Master "Cheater Cord," 1953–1954, page U–98, Cat. No. 1622.